(12) United States Patent
Mahn, Jr.

(10) Patent No.: US 6,224,958 B1
(45) Date of Patent: May 1, 2001

(54) METHOD OF MARKING ELASTOMERIC ARTICLES WITH BAR CODES AND ARTICLE THEREFORE

(75) Inventor: John Mahn, Jr., Cleves, OH (US)

(73) Assignee: Specialty Adhesive Film Co., Cleves, OH (US)

( * ) Notice: Subject to any disclaimer, the term of this patent is extended or adjusted under 35 U.S.C. 154(b) by 0 days.

(21) Appl. No.: 09/064,339

(22) Filed: Apr. 22, 1998

(51) Int. Cl.[7] .............................. B32B 25/00; B60C 13/00
(52) U.S. Cl. ..................... 428/40.1; 283/81; 428/41.6; 428/41.7; 428/41.8; 428/42.1; 428/201; 428/202; 428/204; 428/914
(58) Field of Search ................... 428/40.1, 41.6, 428/41.7, 41.8, 42.1, 201, 202, 204, 914; 427/147; 283/81

(56) References Cited

U.S. PATENT DOCUMENTS

| | | | |
|---|---|---|---|
| 3,952,131 | 4/1976 | Sideman | 428/334 |
| 4,021,591 | 5/1977 | DeVries et al. | 428/200 |
| 4,037,008 | 7/1977 | Tugwell | 428/200 |
| 4,098,935 | 7/1978 | Knudsen | 428/40 |
| 4,202,663 | 5/1980 | Haugh et al. | 8/471 |
| 4,238,190 | 12/1980 | Rejto | 8/471 |
| 4,269,885 | 5/1981 | Mahn | 428/216 |
| 4,395,263 | 7/1983 | Davis | 8/471 |
| 4,421,816 | 12/1983 | Arnold | 428/202 |
| 4,576,610 | 3/1986 | Donenfeld | 8/471 |
| 4,610,904 | 9/1986 | Mahn, Sr. et al. | 428/79 |
| 4,654,044 | 3/1987 | Gilardone, Jr. | 8/471 |
| 4,692,198 | 9/1987 | Borreson | 156/235 |
| 4,923,848 | 5/1990 | Akada et al. | 503/227 |
| 5,120,383 | 6/1992 | Takei et al. | 156/240 |
| 5,160,383 | 11/1992 | Gartland et al. | 152/510 |
| 5,244,524 | 9/1993 | Yamane | 156/230 |
| 5,338,603 | 8/1994 | Mahn, Sr. et al. | 428/349 |
| 5,364,688 | 11/1994 | Mahn, Jr. | 428/187 |
| 5,380,391 | * 1/1995 | Mahn | 428/914 |
| 5,411,783 | 5/1995 | Mahn, Jr. | 428/79 |
| 5,413,841 | 5/1995 | Mahn, Sr. et al. | 428/195 |

FOREIGN PATENT DOCUMENTS 40-2136294  *  5/1990 (JP) .

* cited by examiner

Primary Examiner—Nasser Ahmad
(74) Attorney, Agent, or Firm—Wood, Herron & Evans, LLP

(57) ABSTRACT

A label or transfer adapted to mark an elastomeric article includes a cured elastomeric sheet which is overcoated with a heat resistant polymer preferably a thermoset polyurethane. Indicia is then applied to this heat resistant polymer layer using a thermal transfer printer. The indicia is then overcoated with a second protective layer preferably a clear thermoset polyurethane. The backside of the cured elastomeric film is applied to a surface of the elastomeric article which is being marked. The elastomeric article is then subjected to a cure cycle bonding the elastomeric sheet to the surface of the elastomeric article and permanently marking the article with the indicia. In a preferred embodiment, the indicia is a bar code.

11 Claims, 1 Drawing Sheet

METHOD OF MARKING ELASTOMERIC ARTICLES WITH BAR CODES AND ARTICLE THEREFORE

BACKGROUND

It is now common place to mark articles with identifying indicia particularly bar codes. These are digital codes utilized to identify articles. The bar code is usually identified with a laser scanner. In order for this to properly identify the bar code, the bar code must be printed very precisely. In many applications this is relatively simple. The bar code is simply printed onto a label which is adhered with a pressure sensitive adhesive to the article being identified.

In other applications this is very difficult, particularly with cured rubber articles. Generally, such cured rubber articles have irregular surfaces. When these products are formed and cured, the surface simply is not as smooth as, for example, a molded thermoplastic article. Further, it is very difficult to adhere something to a cured rubber article due to the plasticizers and oils in the rubber. Adhesives generally fail after a period of time. This problem is further exacerbated by the harsh conditions which these articles encounter. Typical cured rubber articles include tires and other automobile parts which are exposed to all types of environmental conditions from −40° F. up to nearly 200° F.

There are many different systems used to provide bar code identification using heat transfers. Mahn U.S. Pat. No. 4,610,904 discloses such a product. However, this will not adhere adequately to a rubber surface. Due to the design of the disclosed product, the bar coding would have to be screen printed. Screen printing is suitable when thousands of the same product are being produced. But when individual bar codes are required it is commercially infeasible. Mahn U.S. Pat. No. 5,413,841 discloses a heat transfer bar code. This uses a sublimation dye transferred into a thermoset layer. Again, this product will not bond to a rubber surface. However, applying the sublimation dye does facilitate printing the individual bar codes.

Mahn U.S. Pat. No. 5,380,391 discloses a heat transfer which is designed to bond to a rubber surface. This uses a cured rubber base material which is in turn marked with a contrasting solvent dye which provides the bar code. The article is overcoated with a protective thermoset layer and the product bonded to the rubber article during the curing process of the rubber article. This is simply placed on the surface of an article which is placed into a mold and cured. The heat and pressure from the curing process bonds the cured rubber based material to the article being marked.

This is good but the base material has an irregular surface. This requires application of the bar code using an ink jet printer or offset printing. It simply is not as crisp or clean as required to be properly readable. Further, the irregular surface of the rubber based material reduces the clarity of the printed bar code. This increases the likelihood of the scanner being unable to properly discern the number from the bar code.

SUMMARY OF THE INVENTION

The present invention is premised on the realization that a high quality machine readable bar code which can be bonded to a rubber article is formed by thermal transfer printing indicia onto a cured rubber layer. More particularly, the present invention is premised on the realization that when a cured rubber base material is first overcoated with a heat resistant layer preferably a thermoset layer, the overcoating layer can provide a sufficiently smooth surface to permit thermal transfer printing which can then be protected with an exterior thermoset layer and applied to a rubber article during the curing of the rubber article.

Preferably the coating layer is a polyurethane and more particularly a solvent dispersed thermosetting polyurethane. Further the protective layer is preferably a thermoset polyurethane.

In a preferred embodiment, the polyurethane coating layer can be pigmented to prevent yellowing of the transfer.

The further objects and advantages of the present invention will become apparent in light of the following detailed description and drawings in which:

DETAILED DESCRIPTION

Figure 1:
FIG. 1 is a top plan view of the present invention.
Figure 2:
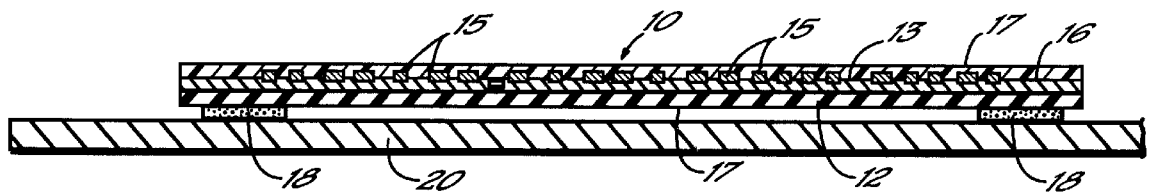
FIG. 2 is a cross-sectional view taken at lines 2—2 of FIG. 1.

As shown in FIG. 1 and FIG. 2, the present invention is a label or transfer 11 which is adapted to be applied to a rubber article which is uncured. The label 11 includes a lower cured rubber layer 12 and a compatible coating material 14 which covers an outer or upper surface 13 of the cured rubber layer 12. Indicia 15 is applied onto the surface of layer 14. As shown, the marking is a bar code and numerals but other markings could be applied as desired. This is then overcoated with a protective layer 16. The lower surface 17 of the cured rubber layer 12 includes two strips 18 of pressure sensitive adhesive which assists in applying the transfer to the rubber article 10 as described below. As shown, these strips 18 also adhere transfer 11 to a release sheet 20.

For use in the present invention, the elastomeric layer 12 as well as the substrate to which it is to be applied can be the same or different compatible elastomeric materials. These can include nitrile rubber, chlorinated polyethylene, neoprene (chloroprene polymers), chlorosulfonyl polyethylene (Hypalon), ethylene ether polysulfides, ethylene polysulfides, ethylene propylene copolymers (EPM), ethylene propylene terpolymers (EPDM), fluorinated hydrocarbons, fluorosilicone, isobutylene, isoprene, organopolysiloxanes, acrylic rubbers, polybutadienes, polyepichlorohydrins, natural rubber, synthetic isoprene, urethane rubbers, (both polyurethane (polyester), and polyurethane (polyethers)) as well as Buna S rubbers such as styrene butadiene copolymer.

The elastomeric substrate (not shown) can be any uncured elastomeric article. These can be, for example, tires, rubber mats, rubber hoses, elastomeric gaskets, elastomeric sheets, shock absorbers and articles of clothing such as boots, hats, or gloves.

The elastomeric sheet material 12 must be an elastomer which is compatible with the elastomeric substrate. Preferably, they will be of the same elastomer. Those skilled in the art can easily select elastomers which can be bonded together by curing under heat and pressure or other similar manner.

The elastomeric sheet will be relatively thin having a thickness of from about 1 to about 20 mils with 10–12 mils being preferred. The elastomeric sheet must contrast with the ink indicia 15 which will be applied and it may be desirable for it to contrast with the substrate. Generally, a good contrasting surface is a white surface. One excellent white elastomeric sheet is natural polybutadiene rubber.

The elastomeric sheet 12 is prepared for printing or coating by cleaning surface 13 with a chlorinated hydrocarbon wipe such as methylene chloride or 1,1,1 trichloroethane. In addition, bleaching the surface with sodium hypochlorite and hydrochloric acid prepares the surface for printing and allows better adhesion of ink and overcoat.

The coating layer 14 can be either a clear or opaque coating. If the indicia 15 contrasts with the layer 12, this can be a clear layer. On the other hand, it may be preferable to use a pigmented layer in order to prevent yellowing of the label 11 and to provide further contrast between the background and the indicia.

Layer 14 can be any polymer which adheres to surface 13 and can withstand cure temperatures. Typical sulphur curing agents are activated at 300–400° F. for a period of thirty minutes. Therefore, this layer would have to withstand these conditions. If the curing system is an electron beam curing system, this layer would have to withstand the energy from the electron beam.

Preferably layer 14 is a thermoset material. Typical thermoset layers for use in the present invention would include thermoset polyamides and thermoset polyurethanes, thermoset polyisocyanates, thermoset polyesters, and thermoset epoxies. Commercially available thermoset polymers include Sinclair Zephylon brand and Lord Corp Chemglaze brand thermoset polyurethanes. These polyurethanes which are preferred are organic solvent based or dispersed polymers which are applied as a coating over the surface 13 of cured rubber layer 12. The solvent assists in bonding the layer 14 to the surface 13 of cured rubber layer 12. The thickness of this layer should be about from 0.1 to 10 mils and preferably 0.5 mil. The polyurethanes include a moisture curing system which sets upon drying.

To form the transfer of the present invention, a large sheet of the cured rubber 12 is adhered to a release sheet 20 with multiple strips 18 of pressure sensitive adhesives. The individual transfers or labels are die cut and the coating layer 14 is then applied. The indicia is then applied. Thermal transfer ink ribbons suitable for use include Avery R70 Series or Eltron B110. These are applied using a thermal transfer apparatus such as a Datamax DMX 600 or Avery Accumark 9500.

Figure 3:
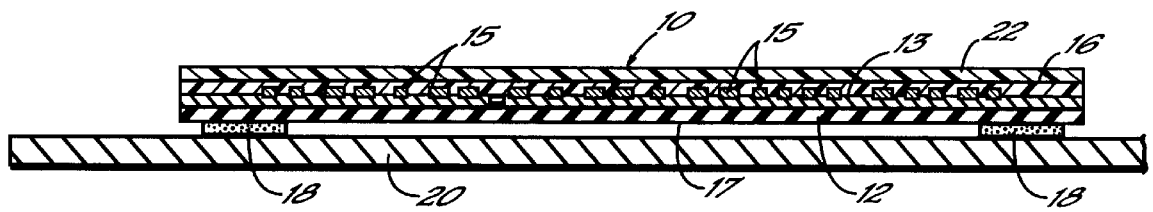
FIG. 3 is a cross-sectional view of an alternate embodiment of the present invention.

Finally, the protective layer 16 is applied. This again can be the same material as coating layer 14 or it can be any thermoset material which is compatible with this material. Again, it must be one which can withstand curing temperatures generally 350–400° F. for fifteen to sixty minutes or other curing mechanisms such as electron beam curing. This layer has to be either clear or translucent and preferably is clear to permit easy identification of the markings. As shown in FIG. 3, an optional protective mylar (polyester) tape 22 can be applied over the protective coating 16 for use as described below.

The heat activated transfer 11 is bonded to an elastomeric substrate not shown by simply removing a label from the release sheet 20 and pressing the bottom side of rubber layer 12 against the surface of the elastomeric substrate. The adhesive strips 18 will temporarily hold the label in position prior to curing. An organic solvent may be applied to the surface of the elastomeric substrate prior to placing the transfer onto that surface to increase tackiness and improve adhesion. Further if talc is present or any parting agent is present on the elastomeric base, this must be removed with a solvent prior to application of the transfer. Once applied to the substrate, the heat activated transfer can be coated itself with a parting agent such as talc if necessary and then subjected to curing conditions.

Generally the article is cured at 350–400° F. for a period of fifteen to thirty minutes. The curing process will cure the substrate and form a permanent bond between the materials. The thermoset layer 16 will protect the indicia 15 and prevent it from being destroyed during application. Further, it holds the transfer in place and prevents it from flowing. The overcoating further protects the transfer from the effects of the elements, gas, oil and spray washing.

As demonstrated, the present invention provides a method to mark an elastomeric article which will withstand extreme temperature variations. When the coating layer 14 is pigmented, particularly pigmented white, it will retard and slow down yellowing of the transfer. This product will remain adhered to the article throughout the life of the article. Further, the indicia itself will remain sufficiently clear and precise as to allow it to be identified using laser scanners throughout the useful life of the product. This permits basically any rubber product which is utilized in the automotive industry to be marked with machine readable indicia.

If the transfer is covered with mylar tape 17 (FIG. 3), it can be used on whitewalls and similar applications. When whitewall tires are retreaded, the whitewalls are painted. The mylar tape 22 covers the label protecting it from the paint (not shown). The tape 17 can subsequently be removed exposing the indicia.

This has been a description of the present invention along with a preferred method of practicing the invention. However, the invention itself should be defined only by the appended claims wherein I claim:

1. A label adapted to be fixed to a rubber article during curing comprising:
   (a) a first layer consisting of a cured elastomeric polymer;
   (b) a second layer consisting of a heat resistant protective coating on a first surface of said first layer;
   (c) indicia comprising a thermal transfer ink applied to a first surface of said second layer;
   (d) a protective thermoset coating covering said first surface of said second layer and said indicia.

2. The label claimed in claim 1 wherein said second layer comprises a thermoset layer.

3. The label claimed in claim 2 wherein said second layer comprises a thermoset polyurethane.

4. The label claimed in claim 1 wherein said protective thermoset coating comprises a polyurethane.

5. The label claimed in claim 3 wherein said thermoset polyurethane is pigmented.

6. The label claimed claim 1 further comprising a pressure sensitive adhesive applied to a portion of a second surface of said first layer.

7. The label claimed in claim 1 further comprises an outer removable layer.

8. The label claimed in claim 7 wherein said outer removable layer comprises a polyester tape.

9. An indicia bearing label adapted to be fixed to a rubber article during heat curing of said article without distortion of said indicia said label comprising
   (a) a first cured elastomeric polymer layer;
   (b) a thermoset protective layer on a first surface of said first layer;
   (c) indicia comprising a thermal transfer ink applied to a first surface of said thermoset protective layer;

(d) an outer protective thermoset coating covering said first surface of said thermoset protective layer.

10. The label claimed in claim 9 wherein said thermoset protective layer is a thermoset polyurethane.

11. The label claimed in claim 10 wherein said thermoset polyurethane is pigmented.

\* \* \* \* \*